(No Model.)
O. NIELSEN & H. A. BEGUELIN.
BICYCLE REST.
No. 585,283. Patented June 29, 1897.
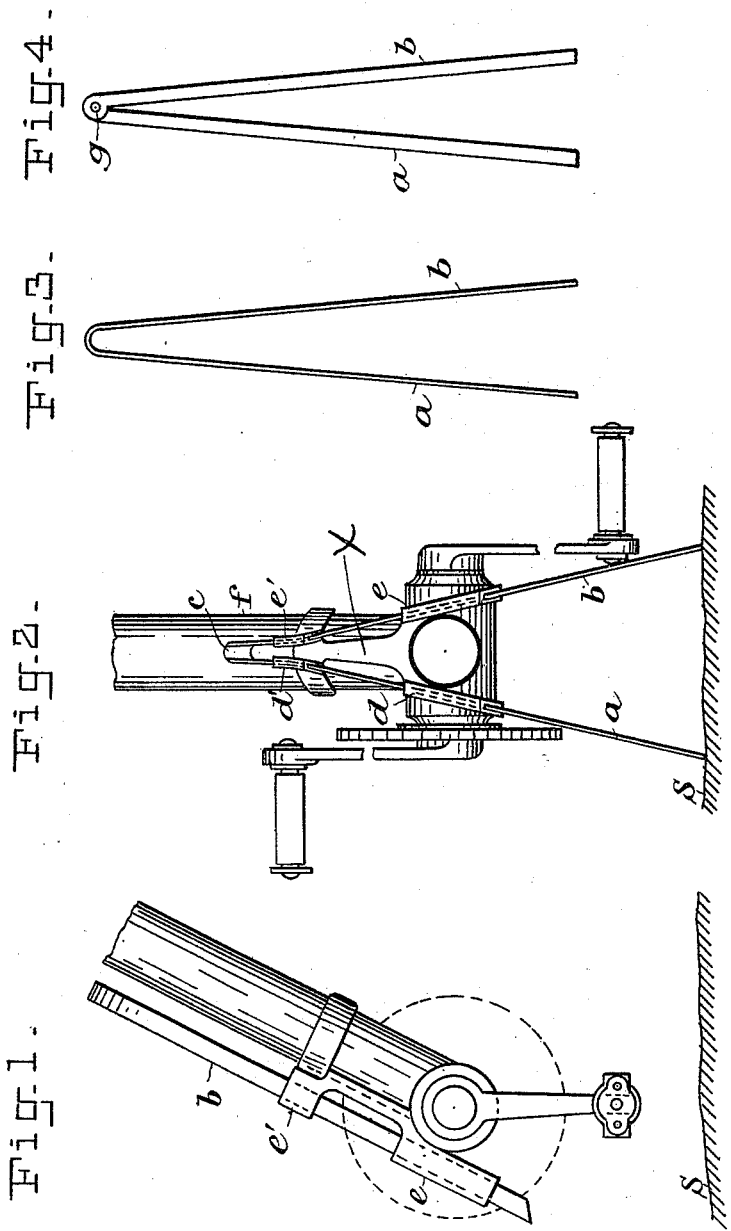
WITNESSES:
E. B. Bolton
E. A. Scott
INVENTORS:
Otto Nielsen
Henry August Beguelin
BY
ATTORNEYS

UNITED STATES PATENT OFFICE.

OTTO NIELSEN AND HENRY AUGUSTE BEGUELIN, OF NEW YORK, N. Y.

BICYCLE-REST.

SPECIFICATION forming part of Letters Patent No. 585,283, dated June 29, 1897.

Application filed October 14, 1896. Serial No. 608,870. (No model.) Patented in Switzerland September 13, 1896, No. 14,176.

*To all whom it may concern:*

Be it known that we, OTTO NIELSEN and HENRY AUGUSTE BEGUELIN, citizens of the United States, and residents of New York, State of New York, have invented certain new and useful Improvements in Bicycle-Rests, (patented in Switzerland September 13, 1896, No. 14,176;) and we hereby declare the following to be a full, clear, and exact specification.

Our invention consists in the special features hereinafter described and specifically claimed.

In the drawings, Figure 1 is a side view; Fig. 2, a front view of the invention in place on the frame, one of the frame-bars being shown in section. Fig. 3 is a detail view of the fork, and Fig. 4 is a view of a modified form of the fork.

Our invention relates to a fork serving to keep a bicycle in its normal vertical position. It consists of two metallic branches $a$ and $b$, connected at the point $c$ and held in position by sliding guides—as, for instance, $d$ and $e$ or $e'$ and $d'$—fixed against the lower central part $f$ of no matter what bicycle. The guides form a sharp angle $y$, the bisector $X$ $X$ of which passes through the center of the frame $f$.

When the branches $a$ and $b$ are lowered, they separate to the right and to the left, as shown in Fig. 2 of annexed drawings, until they assure the stability of the bicycle after touching the ground $s$.

When the branches are raised, they occupy a very small space against the frame of the machine. The fork can be held in either of its extreme positions either by a screw or the like or by simple friction without any other locking means.

The branches $a$ and $b$ can be rigid or flexible, solid or hollow, and of any cross-section, round, rectangular, &c. If they are flexible, they can be connected in no matter what manner at their upper part, or they can consist of one piece bent in the shape of a V, as shown in Fig. 3. If, on the contrary, they are rigid, said branches must be connected pivotally around an axle $g$. (Shown in Fig. 4.)

The guide which is formed by the slides $e$ $d$ $e'$ $d'$ can be of any metal. It can be soldered to the frame of the bicycle or simply screwed upon the same or attached in any other manner. They can besides be constructed at a more or less sharp angle, according to the degree of separation it is desired to give to the fork. The size of the fork and of the guides can vary according to the size of the bicycle.

It will be seen that there is a guide at $d'$ and $e'$ for each limb of the support, and when two sets of guides are used they are, as shown, all carried by a clamp or bracket, as shown at X in Figs. 1 and 2.

What we claim is—

In combination with a bicycle, a support therefor comprising the pair of divergent arms and a pair of upper and a pair of lower guides, a clip carrying said guides having a band at its upper end to embrace the inclined frame-bar and having its lower end resting on the upper side of the frame-bar at the crank-hanger the lower guides being wider apart than the upper guides and extending down on each side of the frame-bar, substantially as described.

In witness whereof we have hereunto set our hands in presence of two witnesses.

OTTO NIELSEN.
HENRY AUGUSTE BEGUELIN.

Witnesses:
H. VAN OLDENNEEL,
E. B. BOLTON.